Aug. 22, 1967         R. H. W. THORN ETAL         3,336,956
          APPARATUS FOR SUCCESSIVELY INTRODUCING FLOWABLE
Filed April 27, 1964         MATERIAL INTO CONTAINERS
                                              6 Sheets-Sheet 1

INVENTOR
RICHARD H.W. THORN ETAL
BY Mawhinney & Mawhinney
ATTYS

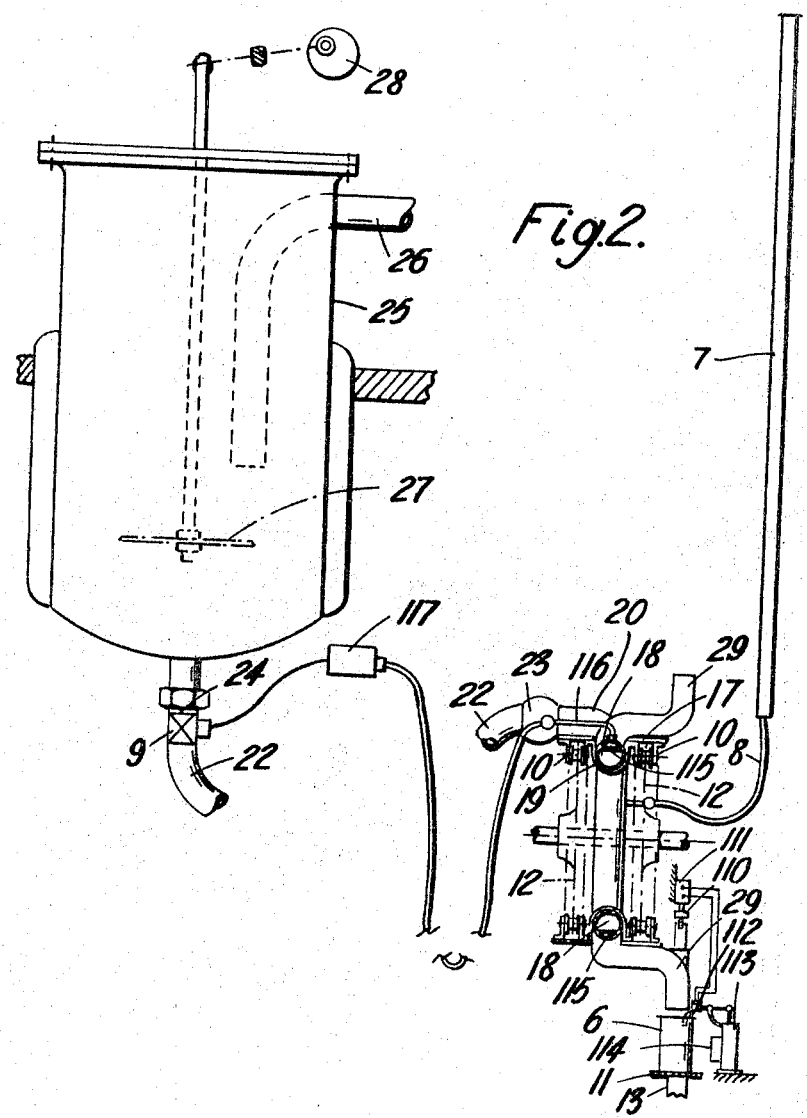

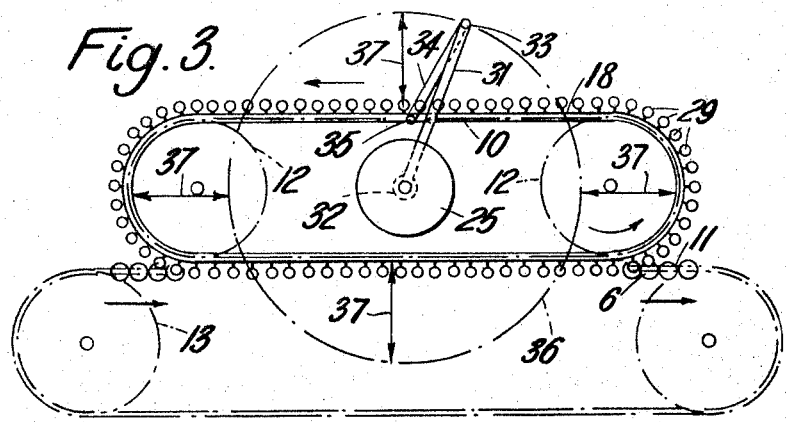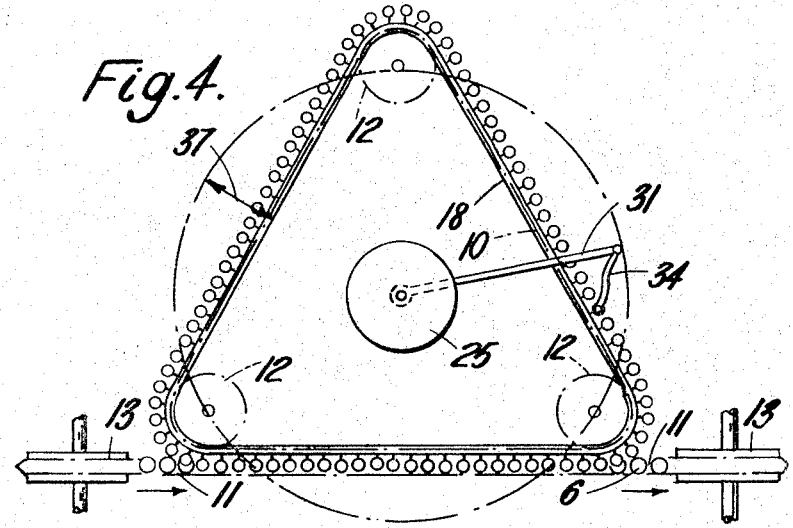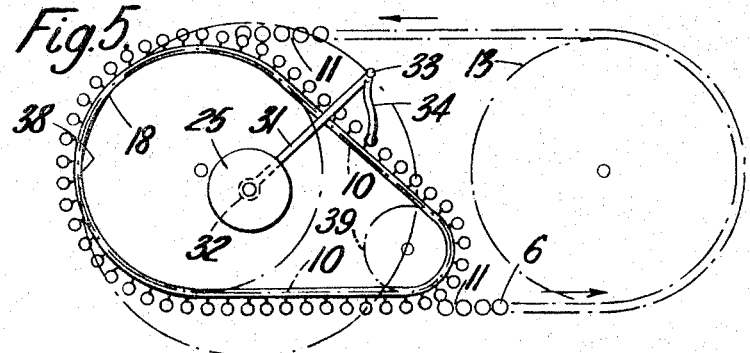

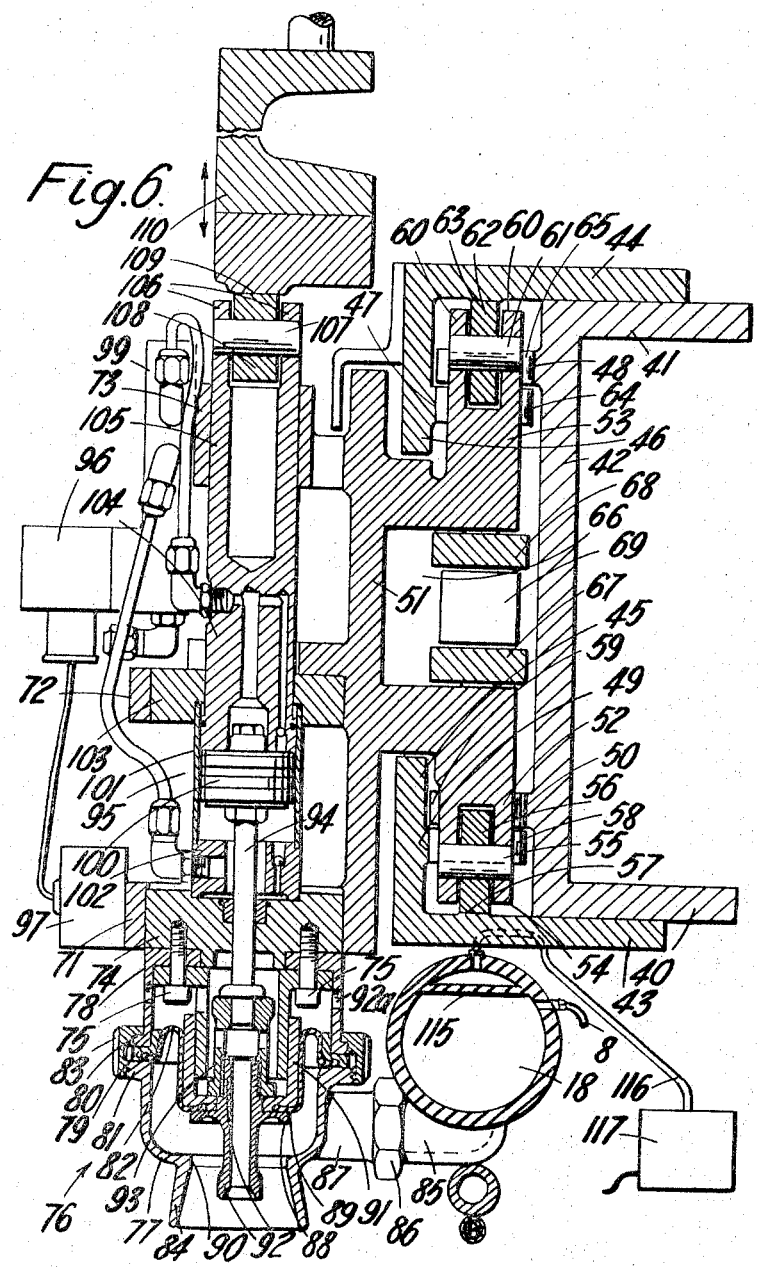

Aug. 22, 1967  R. H. W. THORN ETAL  3,336,956
APPARATUS FOR SUCCESSIVELY INTRODUCING FLOWABLE
MATERIAL INTO CONTAINERS
Filed April 27, 1964  6 Sheets-Sheet 5
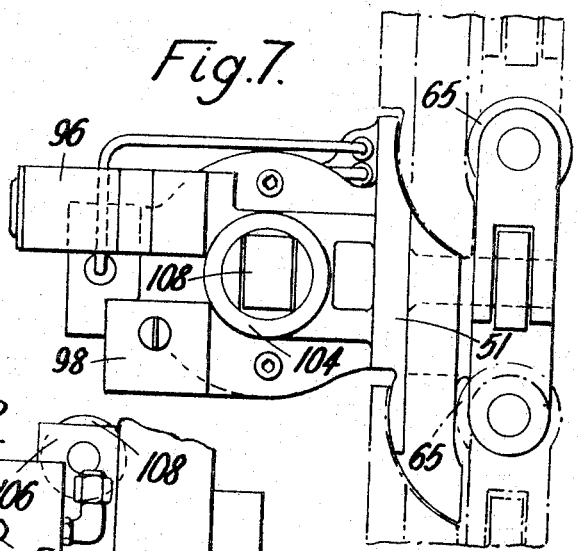
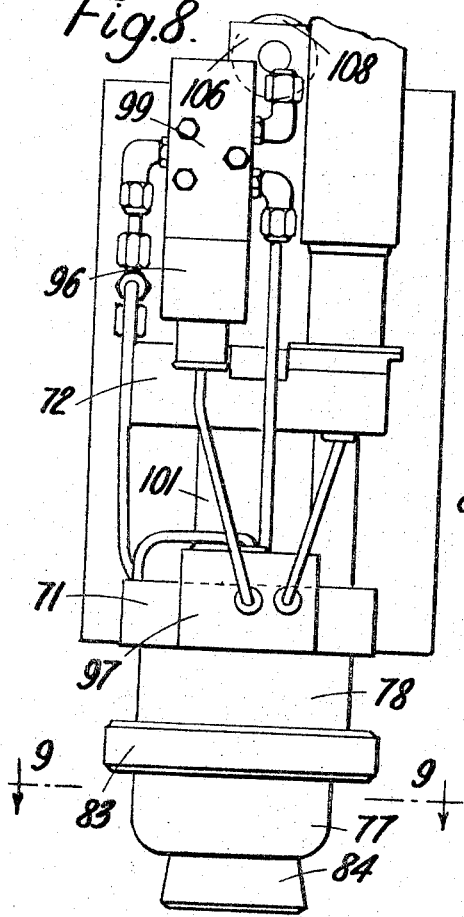
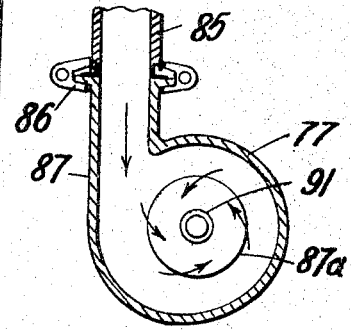
INVENTOR
RICHARD H.W. THORN ET AL
BY McKinney & McKinney
ATTYS

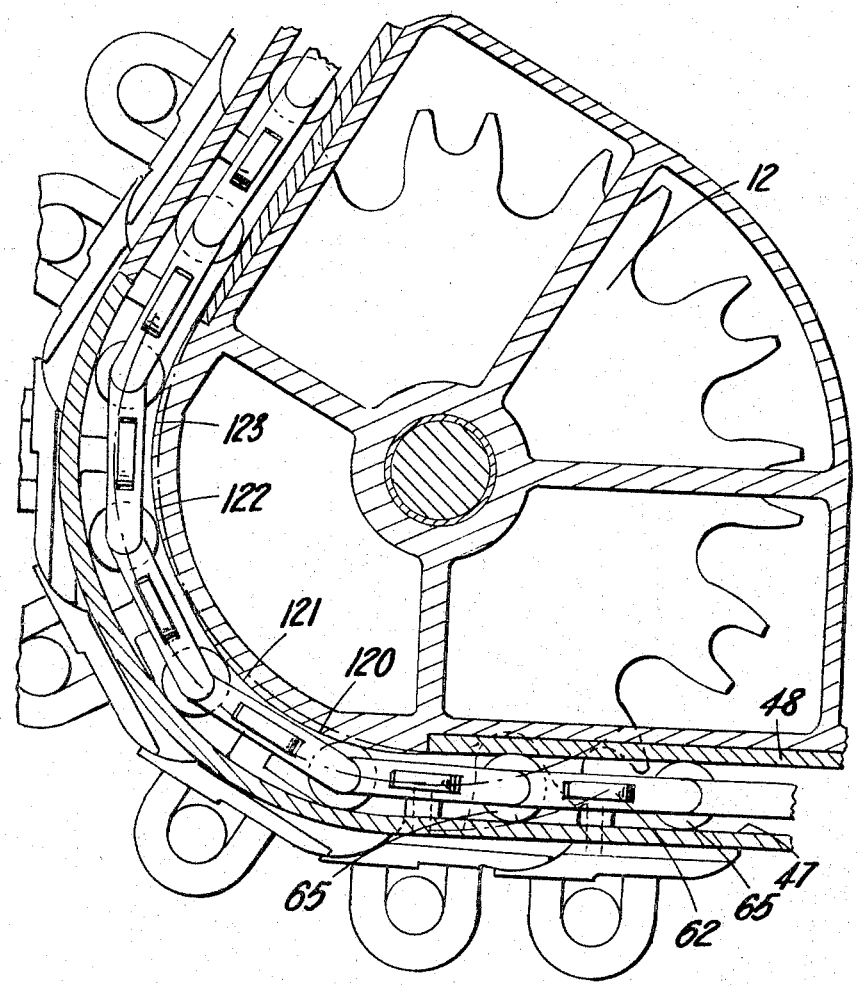

United States Patent Office 3,336,956
Patented Aug. 22, 1967

3,336,956
APPARATUS FOR SUCCESSIVELY INTRODUCING FLOWABLE MATERIAL INTO CONTAINERS
Richard Henry William Thorn, Chorleywood, and Jozef Tadeusz Franek, London, England, assignors to H. J. Heinz Company Limited, London, England, a British company
Filed Apr. 27, 1964, Ser. No. 364,884
Claims priority, application Great Britain, Apr. 25, 1963, 16,393/63
15 Claims. (Cl. 141—83)

This invention relates to an apparatus for successively introducting flowable material into containers and particularly for introducing substantially identical quantities of liquid foodstuffs into cans. Certain objects of the invention are to provide an arrangement in which a high rate of travel of the containers may take place through the apparatus, for example, of up to 1000 cans per minute and also to provide an arrangement in which should the row of cans through the apparatus be stopped those cans which are being filled at that time will continue to be filled with the predetermined charge.

Further objects are to provide for accurately measuring the material for introduction into the cans irrespective of varying speeds of travel of the cans through the apparatus; to prevent excessive spillage or dripping from the parts of the apparatus from which the material is introduced into the can; to prevent any solid particles in the flowable material from being mashed during their delivery, and to provide an arrangement which is simple to maintain, adjust and clean.

According to this invention an apparatus for successively introducing flowable material into open topped containers comprises an endless conveyor adapted to support the containers, a travelling endless flexible pipe having a stretch thereof arranged opposite and moving with a stretch of said conveyor, delivery devices on said flexible pipe and spaced apart so that each is arranged opposite a container on said conveyor throughout the travel of said stretch thereof, a reservoir for the material to be introduced into said containers a flexible conduit between said reservoir and said endless flexible conduit, and a connection on said conduit adapted to accommodate for the continuous movement of the flexible pipe in a closed path.

The endless flexible pipe may be supported by an endless flexible conveyor comprising two spaced endless flexible members between which ends are cross members which support the endless flexible pipe.

The flexible pipe may be supported by another endless conveyor and each said endless conveyor may comprise chains in which pivots connecting the links of a chain engage a guide as the chain moves around at least one of a plurality of wheels which guide is shaped to maintain the chain taut and wherein said reservoir is disposed substantially symmetrically with respect to said axes whereby the flexing of said flexible conduit is reduced to a minimum.

In any of the arrangements referred to above means may be provided for maintaining the pressure of the material in the flexible pipe constant.

The flexible pipe may be provided with an internal flexible partition to provide two continuous spaces with one of which communicates said further flexible pipe for supplying flowable material and wherein the other space comprises an air chamber the pressure of air in which varies with changes of pressure in the flowable material and wherein means responsive to changes in air pressure are arranged to control the means for maintaining the pressure of the supply of flowable material substantially constant.

In such an arrangement another flexible pipe may communicate with said air space and with means responsive to air pressure which means are mounted on a stationary part of the apparatus.

Means may also be provided for releasing air which may collect in said endless pipe.

Each of the aforesaid delivery devices on the endless flexible pipe may comprise a valve controlled outlet passage.

Each said valve controlled passage may have associated therewith means for imparting to the material an ordered rotational swirl about the general direction of flow into a container whereby rebound of the material out of the container is prevented.

Timing mechanism may be provided for controlling each said valve so that material is delivered to each container for a predetermined length of time.

In such an arrangement means responsive to the level in each container may be arranged to adjust the timing mechanism whereby the amount of material supplied by the delivery device is adjusted during said predetermined length of time.

The timing mechanism may be set in operation by a signal initiated by a container coming into proximity with means responsive to the presence of a container.

In the case where the apparatus is for use with containers formed from ferrous material said timing mechanism is set in operation by electromagnetic means which is influenced by the presence of a container and initiates a signal which controls the timing mechanism for one of said valves.

Means may be provided for adjusting the extent of opening of each valve controlling an outlet passage from said endless flexible pipe and said timing mechanism arranged to maintain the time during which the valve is open substantially constant.

A valve for each valve controlled outlet passage may be provided with a sharp peripheral cutting edge which passes into a part in said passage also having a sharp cutting edge.

Other features of the invention are set out in the following description and appendant claims.

The following is a description of a number of alternative arrangements suitable for filling cans with flowable food products, reference being made to the accompanying drawings in which:

FIGURE 2 is a section on the line 2—2 of FIGURE 1;

FIGURE 3 is a diagrammatic plan view of an alternative arrangement of the conveyors;

FIGURE 4 is a further diagrammatic plan view of an alternative arrangement of conveyors;

FIGURE 5 is a plan view of yet a further alternative arrangement of the conveyors;

FIGURE 6 is a vertical section through a part of the main frame of the apparatus and through one of the links of the chain which carries one of the delivery devices;

FIGURE 7 is a plan view of the arrangement shown in FIGURE 6 but omitting the main frame of the apparatus;

FIGURE 8 is a side elevation of the arrangement shown in FIGURE 6 and also omitting the main frame of the apparatus;

FIGURE 9 is a sectional plan on the line 9—9 of FIGURE 8; and

FIGURE 10 is a horizontal section through a part of an apparatus having its endless conveyors arranged in the manner shown in FIGURE 4 and showing a part of that chain which carries the delivery devices and also shows one of the sprocket wheels around which it passes.

Figure 1:
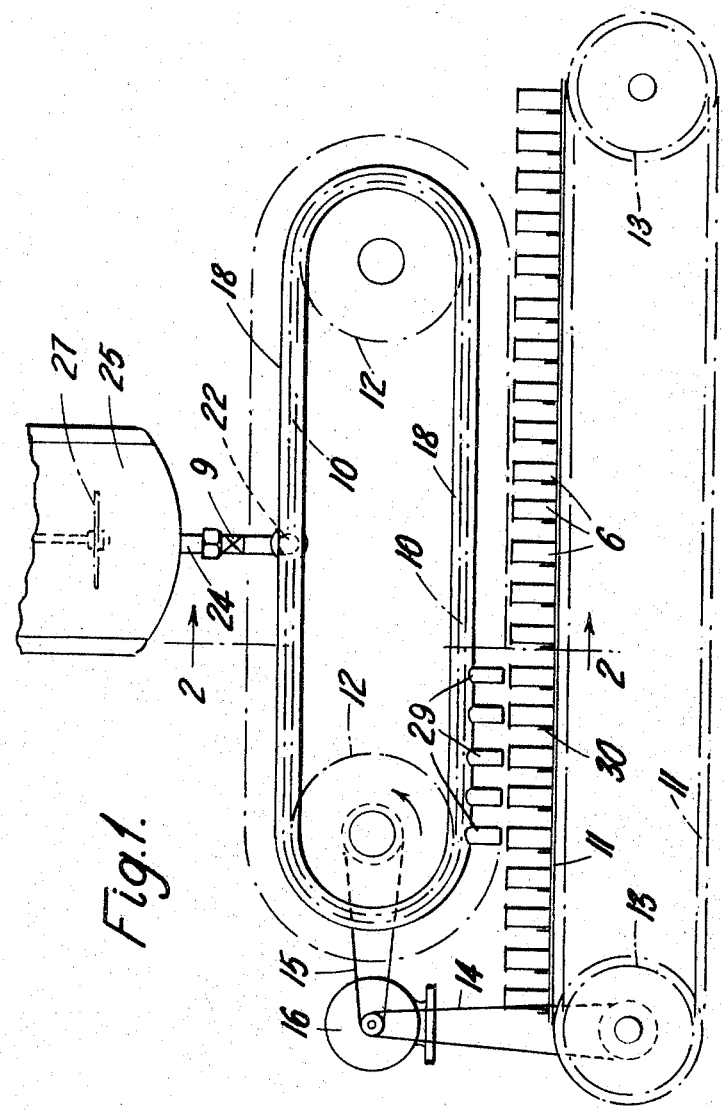
FIGURE 1 is a diagrammatic side elevation of one form of the apparatus.

Referring to the arrangement shown in FIGURES 1 and 2 there are provided two endless chain conveyors 10 and 2 there are provided two endless chain conveyors 10 and 11 which pass around pairs of sprocket wheels 12 and 13 respectively which are both driven through transmissions 14, 15 from one and the same motor 16. By these means the opposing stretches of the two endless chain conveyors are driven at the same speed and in the same direction and are parallel with one another.

The endless chain conveyor 10, as will be seen from FIGURE 2, is provided with two chains arranged side by side and encircling double chain wheels 12 at opposite ends. The corresponding links of the two chains are secured together by cross members 17 which provide cradles for an endless flexible feed tube 18 secured in position by suitable clips 19.

Extending from one location on the flexible pipe 18 is a short length of flexible pipe 20 which is secured to one end of a second flexible pipe 22 by a universal rotatable joint 23, the other end of the second flexible pipe being connected at 24 either to a valve-controlled pipeline (not shown) for the supply of material under pressure or to the bottom of a supply reservoir 25 which is mounted on a stationary part of the apparatus at a location midway between the sprocket wheels 12. During the movement of the endless conveyor 10 the end of the flexible tube nearest the conveyor moves laterally as it travels between the sprocket wheels and also moves in an up and down direction as it travels around the sprocket wheels. This results in relative rotational movement between the tube 18 and pipe 22 which is permitted by the universal joint 23.

The reservoir is fed with the flowable food material through a pipe 26 connected to a pump (not shown). The level of the liquid in the reservoir 25 is maintained substantially constant by a level sensing device 27, up and down movement of which controls the supply pump through a suitable mechanism 28.

Disposed to one side of the flexible pipe 18 and connected to it are a number of delivery devices 29 one for each link of the chain, details of which delivery devices and their time controlled valves are described later.

The spacing of the links of the lower endless chain conveyor 11 is the same as that of the links of the upper chain conveyor 10 and each link is provided with means 30 for locating a can opposite one of the delivery devices 29 so that the material is delivered into each can as it is travelling along with its open top in register with a delivery device.

As will be seen from FIGURES 1 and 2 the axes of rotation of both pairs of sprocket wheels 12 and 13 are horizontal and are so arranged that the lower stretch of the upper endless chain conveyor is parallel with the upper stretch of the lower endless conveyor.

In the arrangement shown in FIGURE 3 which is a plan view the axes of rotation of the sprockets 12 for the upper endless chain conveyor 10 are vertically disposed whereas the axes of rotation of the sprockets 13 for the lower conveyor 11 may either also be arranged vertically, as shown in the figure, or horizontally as shown in FIGURE 1.

In this arrangement the supply reservoir 25 is disposed above and between the two stretches of the conveyor 10.

There is provided a rigid delivery pipe 31 attached to the bottom of the reservoir 25 by a connection 32 which permits the pipe to rotate relatively to the reservoir about a vertical axis, and the end of the rigid supply pipe 31 is connected by a swivel connection 33 to a flexible pipe 34 which in its turn is connected by a swivel connection 35 to the flexible pipe 18. Thus as the conveyor moves the flexible pipe 18 will drag the flexible pipe 34 and the rigid delivery pipe 31 around with it.

The arrangement shown in FIGURE 4 is somewhat similar to that of FIGURE 3 except that the endless conveyor 10 extends around three sprocket wheels 12 arranged to rotate about vertical axes so that the endless conveyor 10 has three stretches forming the sides of a triangle, and the other endless conveyor 11 extends beneath one of those stretches.

In the arrangements shown in FIGURES 3 and 4 the length of the rigid pipe 31 is such that the distances between the end of the pipe and the endless conveyor at the four locations indicated by the arrowed lines 37 are the same. By this means the necessary length of the flexible pipe 34 is kept to a minimum, indicated by lengths of the arrowed lines 37.

In the arrangement shown in FIGURE 5 the upper endless conveyor 10 is arranged to pass around a large sprocket wheel 38 and a smaller sprocket wheel 39 and both sprocket wheels rotating about vertical axes. In this case the sprocket wheels 13 driving the lower endless conveyor 11 are shown to be rotating about vertical axes and the sprocket wheels 13 for the lower conveyor are of the same diameter as the larger sprocket wheel 38.

It will be appreciated that with any of the arrangements referred to above in which the sprockets of the conveyor 11 rotate about horizontal axes the cans are removed from that conveyor before it passes around a sprocket wheel 13.

In any of the arrangements in which the sprocket wheels of the endless conveyor 11 rotate about vertical axes the cans can be removed from the lower conveyor at any point along its length and the different stretches of the outer endless conveyor 10 can be utilized, in conjunction with additional appropriately positioned lower conveyors, for filling different sets of cans.

Referring now to FIGURES 6 and 7 for details of the delivery devices: the main frame of the apparatus comprises a stationary channel section member having flanges 40, 41 and a web portion 42 which channel section member extends between two sprocket wheels which support the upper endless conveyor and are arranged to rotate about vertical axes.

Secured to the two flanges 40, 41 respectively are the flanges 43, 44 of angle section members, the other flanges 45, 46, of which are spaced away from the web portion 42 of the aforesaid stationary channel section member.

The opposed faces of the flange 46 and web portion 42 are provided with flat faced projecting guide tracks 47 and 48 respectively and similarly the opposed faces of the flanges 45 and web portion 42 are provided with projecting flat faced guide tracks 49, 50.

Each link of the upper endless conveyor comprises a somewhat complex casting comprising a vertically disposed web portion 51 from one side of which projects two vertically spaced portions 52, 53. The lower extremity of the portion 52 is forked at 54 and extending across the limbs of the fork is a spindle 55 on which is rotatable a roller 56. The roller engages a guide track 57 on the inner face of the flange 43 of the angle member secured to the flange 40. The portion 52 is also formed with two slots (not shown) across each of which extends a vertical spindle and mounted on the two spindles are rollers 58, 59 which engages respectively the tracks 49 and 50.

The upper extremity of the portion 53 is forked at 60 and extending across the limbs of the fork is a spindle 61 on which is rotatable a roller 62 which engages a projecting guide track 63 on the inner face of the flange 44 of the aforesaid angle section member.

The upper portion 53 is also provided with slots (not shown) across which extend vertical spindles on each of which are mounted two rollers 64, 65 which engage respectively the tracks 47 and 48. Thus between the two sprocket wheels the stretches of the chain are rendered rigid.

Across the gap 66 between the two portions 52, 53 there extends vertical spindles (not shown) on each of which are mounted two rollers 67, 68 spaced apart by a spaced member 69. The two rollers 67, 68 engage between teeth on the sprocket wheel as the chain passes around it.

Extending from the other side of the web portion 51 to the portions 52, 53 are three lugs 71, 72, 73, the lug 71 is provided with a hole in which is located a plate 74 to which is secured by screws 75 a delivery device indicated generally at 76.

The delivery device comprises a two part casing 77, 78 having flanges 81, 80 clamped on either side of a washer 79 and a flexible diaphragm 82 by a clamping ring 83. The lower casing part 77 is provided with a diverging delivery nozzle 84.

The passage within the casing part 77 beneath the diaphragm 82 is supplied with flowable material from the aforesaid flexible pipe 18 through a branch passage 85 which is clamped at 86 to a stud pipe 87 extending tangentially with respect to the aforesaid passage so that the material leaving the diverging nozzle 84 has imparted to it an ordered swirl about a vertical axis.

The various stud pipes 87 on the delivery devices and the branch passages 85 serve to support the endless flexible pipe 18 along its length.

Clamped to the center of the diaphragm 82 is a valve member 88 having a sharp edged peripheral portion 89 which can enter snugly a sharp edged cylindrical port 90 at the smaller end of the diverging portion 84.

The valve member has a hollow stem 92 which enables any air trapped within the swirling material to pass from the underside of the diaphragm to the upper side where it can leave through ports 92a formed in the upper casing part 78.

The diaphragm 82 and the bottom of a cup shaped element 91 are clamped to the valve member 88 by a nut portion 93 which in its turn engages an operating rod 94 actuated by a double acting reciprocatory fluid energised motor indicated generally at 95.

It will be appreciated that, for a given pressure of fluid in the flexible pipe 18, the amount of flowable material which can pass through the delivery nozzle 84 in a given time will be determined inter alia by the gap between the lower side of the valve member 88 and the edge of the port 90.

The double acting reciprocating fluid energised motor comprises a piston 100 which is secured to the aforesaid rod 94 and a cylinder 101 which is disposed between a stationary cylinder head 102 carried by the plate 74 and a plate 103 secured within a hole in the lug 72. The other cylinder head 104 is adjustable in an axial direction within the plate 103 and cylinder 101.

The change-over valve mechanism for the double acting fluid operated motor is indicated generally at 99 and is controlled by an electronic timer 98 (FIGURE 7) of a known kind and which timer when set into operation, is arranged so to actuate the change-over valve mechanism 99 for the motor that it moves the valve 88 from a position where it is within the port 90 under which conditions the diaphragm is sealing the port to a position shown in FIGURE 6 and after a predetermined length of time moves it back again to the first said position.

As will be seen from any of FIGURES 1 to 5 the path of movement of the cans on the inlet side of the apparatus converges towards the path of movement of the delivery devices and in the case where each can is formed from ferrous material it is arranged to influence an electro-magnetic device 97 (FIGURE 8) on its associated delivery device which electro-magnetic device operates a switch in circuit with a solenoid 96 which in its turn triggers off an electronic timer indicated generally at 98 in FIGURE 7. The timer 98 first moves the valve 88 from a position where it lies within the port 90 to the position shown in FIGURE 6, and after a predetermined time moves it back into its initial position.

It will be appreciated that for a given supply pressure of the fluid material the amount of the material flowing into the container during the predetermined time when the valve is open will depend on the gap between the valve 88 and the upper edge of the port 90. For different consistencies of material it may be necessary to adjust the aforesaid gap in order that amount delivered should be the same for all materials. For this purpose means are provided for adjusting the extent of the upward stroke of the piston. This is effected by means which may move the piston head 104 (FIGURE 6) in an up and down direction.

For this purpose the cylinder head 103 is provided with an upwardly extending shank 105 formed with a fork 106 at its upper end between the limbs of which extends a spindle 107 on which is rotatable a roller 108.

The roller engages a straight track 109 which is secured to a part 110 which is so mounted on a fixed part of the apparatus that it may be moved in an up and down direction.

The means for raising and lowering the member 110 may be similar to that shown in FIGURE 2 and comprise a reciprocable motor 111 which is controlled by a known form of level sensing device 112 which is raised and lowered into each can when it reaches a position in which the can should have received the required change of material and which raising and lowering may be effected by electro-magnetic means 113 controlled by an electro-magnetically operated switch mechanism 114 which is actuated each time a can passes it. Thus, for example, should the level sensing device 112 show that the can is not sufficiently full it sends a signal to the motor 111 causing that motor to raise the member 110 which results in the cylinder head 104 being raised.

It is also desirable to maintain the pressure constant of the flowable material in the flexible pipe 18. For this purpose the pipe is provided with an internal flexible portion 115 extending along the full length thereof thus forming two spaces one of which contains the flowable material and the other of which contains air. Thus should there be an increase of pressure in the flowable material the partition flexes and increases the pressure of the air and a pipe 116 extends from the air space to a pressure responsive device 117 of known form which controls either the valve in the pipeline which supplies the material under pressure or controls the head of material in the reservoir by varying the rate of delivery of a delivery pump which supplies the material to the reservoir or (as shown in FIGURE 2) controls a valve 9 in a substantially stationary part of the pipeline 22.

Means are also provided for releasing any air or gas which may accumulate in the flexible pipe 18. Said means may comprise an additional flexible pipe connected at one end to the pipe 18 and moving therewith and having its other end connected to a stationary upwardly extending pipe 7 the upper end of which is either connected to the upper part of the reservoir 25 whereby any flowable material carried over with the vented air or gas is delivered back again into the reservoir or the upper end is above the level of material in the reservoir and is open to atmosphere, as shown in FIGURE 2.

The first said end of the pipe 8 is connected to the pipe 18 adjacent the diaphragm 115 so as to communicate with the part of the pipe 18 carrying the flowable material. It will be appreciated that in the arrangement shown in FIGURES 1 and 2 the pipe 8 will only be able to vent off air or gas when the part of the pipe 18 to which it is connected moves to the upper part of the conveyor, whereas in the arrangements in FIGURES 3, 4 and 5 the pipe 8 will be able to vent off air or gas at all times.

As is well known chain transmission suffer unwanted vibrations being set up, and in the present instance this undesirable vibration may set up surges in the flowable material in the first said flexible pipe causing fluctuations in the rate of feed of the flowable material into the cans.

It is thus most important that means should be provided for eliminating such vibrations particularly when the stretches of the chain, between the sprocket wheels are rendered rigid by said guide tracks which produces slack in the chain around the sprocket wheels. These means are shown in FIGURE 10.

As described earlier in the specification the two rollers 64, 65, are disposed between the tracks 47, 48 and the rollers 56 and 62 (only the latter being shown in FIGURE 10) engage the lower and upper tracks, 57 and 63 respectively, not shown in FIGURE 10.

As the rollers 65, pass into engagement with the teeth of the sprocket wheel they leave the tracks 47, 48 and engage continuations of these tracks disposed above and below the sprocket wheels and which as viewed in plan are of curved configuration. The arrangement shown in FIGURE 10 is suitable for use at each corner of the triangular configuration of FIGURE 4, and it is found with this particular arrangement the continuation of each track has a gradually increasing radius of curvature for an angular displacement of 30° as indicated at 120 and then a gradually decreasing radius of curvature as indicated at 121 over another 30°, then further increase of radius of curvature at 122 over the next 30° and finally a decreasing radius of curvature over the next 30° at 123.

With this arrangement the rollers are forced outwardly as they pass around a sprocket wheel thereby increasing the tension of the chain, and there is little or no pressure between the rollers and the sides of the teeth during their path of movement around this curved surface and the main pressure is taken by the teeth as they pass beyond the curved surface onto the straight guiding surfaces 47, 48.

We claim:

1. An apparatus for successively introducing flowable material into open topped containers comprising an endless conveyor adapted to support the containers, a travelling endless flexible pipe formed from a single length of piping having a stretch thereof arranged opposite and moving with a stretch of said conveyor, delivery devices on said flexible pipe and spaced apart so that each is arranged opposite a container on said conveyor throughout the travel of said stretch thereof, a reservoir for the material to be introduced into said containers, a flexible conduit one end of which is connected to said reservoir and the other end of which is connected directly to said endless flexible pipe and moves therewith, and a connection on said flexible conduit adapted to accommodate for the continuous movement of the flexible pipe in a closed path.

2. An apparatus according to claim 1, wherein said endless flexible pipe is supported by an endless conveyor comprising two spaced endless flexible members between which endless flexible members are cross members which support the endless flexible pipe.

3. An apparatus according to claim 1 wherein said flexible pipe is supported by an endless conveyor and each said conveyor comprises chains which extend around spaced wheels and the pivots connecting the links of a chain engage a guide as the chain moves around at least one of said wheels which guide is shaped to maintain the chain taut and wherein said reservoir is disposed substantially symmetrically with respect to the axes of the wheels around which the chains supporting the flexible pipe extend whereby the flexing of said flexible conduit is reduced to a minimum.

4. An apparatus according to claim 1 wherein means are provided for maintaining the pressure of the material in the flexible pipe constant.

5. An apparatus according to claim 4 wherein the flexible pipe is provided with an internal flexible partition to provide two continuous spaces with one of which communicates said flexible conduit for supplying flowable material and wherein the other space comprises an air chamber the pressure of air in which varies with changes of pressure in the flowable material and wherein means responsive to changes in air pressure are arranged to contol the means for maintaining the pressure of the supply of flowable material substantially constant.

6. An apparatus according to claim 5 wherein another flexible pipe communicates with said air space and with said means responsive to air pressure which means are mounted on a stationary part of the apparatus.

7. An apparatus according to claim 1 wherein means are provided for releasing air which may collect in said endless pipe.

8. An apparatus according to claim 1 wherein each said delivery device on the endless flexible pipe comprises a valve controlled outlet passage.

9. An apparatus according to claim 8 wherein each said valve controlled outlet passage has associated therewith means for imparting to the material an ordered rotational swirl about the general direction of flow into a container whereby rebound of the material out of the container is prevented.

10. An apparatus according to claim 1 whereby each said delivery device on the endless pipe comprises a valve controlled outlet passage and timing mechanism controlling each valve so that material is delivered to each container for a predetermined length of time.

11. An apparatus according to claim 10 wherein means responsive to the level in each container is arranged to adjust the timing mechanism whereby the amount of material supplied by the delivery device is adjusted during said predetermined length of time.

12. An apparatus according to claim 10 wherein said timing mechanism is set in operation by a signal initiated by a container coming into proximity with means responsive to the presence of a container.

13. An apparatus according to claim 10 for use with containers formed from ferrous material and wherein said timing mechanism is set in operation by electro-magnetic means which is influenced by the presence of a container and initiates a signal which controls the timing mechanism for one of said valves.

14. An apparatus according to claim 10 wherein means are provided for adjusting the extent of opening of each valve controlling an outlet passage from said endless flexible pipe and said timing mechanism arranged to maintain the time during which the valve is open substantially constant.

15. An apparatus according to claim 10 wherein the valve of each valve controlled outlet passage is provided with a sharp peripheral cutting edge which passes into a part in said passage also having a sharp cutting edge.

References Cited

UNITED STATES PATENTS 2,383,975    9/1945    Kraonquest _____ 141—135 X
2,701,674    2/1955    Christiansen _____ 141—135 X LAVERNE D. GEIGER, *Primary Examiner.*

E. J. EARLS, *Assistant Examiner.*